US010572564B2

(12) United States Patent
Maeda

(10) Patent No.: US 10,572,564 B2
(45) Date of Patent: Feb. 25, 2020

(54) INFORMATION-LINK SYSTEM, INFORMATION-LINK PROGRAM, AND METHOD OF OPERATING THE INFORMATION-LINK SYSTEM

(71) Applicants: Futoshi Hikage, Osaka (JP); Tatsunori Maeda, Osaka (JP)

(72) Inventor: Tatsunori Maeda, Osaka (JP)

(73) Assignees: Futoshi Hikage, Osaka (JP); Tatsunori Maeda, Osaka (JP)

( * ) Notice: Subject to any disclaimer, the term of this patent is extended or adjusted under 35 U.S.C. 154(b) by 0 days.

(21) Appl. No.: 15/553,488

(22) PCT Filed: Apr. 13, 2016

(86) PCT No.: PCT/JP2016/061956
§ 371 (c)(1),
(2) Date: Aug. 24, 2017

(87) PCT Pub. No.: WO2016/185840
PCT Pub. Date: Nov. 24, 2016

(65) Prior Publication Data
US 2018/0068030 A1    Mar. 8, 2018

(30) Foreign Application Priority Data

May 15, 2015 (JP) .................... 2015-100406

(51) Int. Cl.
*G06F 16/955* (2019.01)
*G06F 16/13* (2019.01)
(Continued)

(52) U.S. Cl.
CPC .......... *G06F 16/9566* (2019.01); *G06F 12/00* (2013.01); *G06F 13/00* (2013.01);
(Continued)

(58) Field of Classification Search
CPC ....................................................... G06F 3/048
(Continued)

(56) References Cited

U.S. PATENT DOCUMENTS 6,061,738 A * 5/2000 Osaku ............... G06F 17/30241
709/245
9,794,603 B1 * 10/2017 Nijim ................. H04N 21/2355
(Continued)

FOREIGN PATENT DOCUMENTS

JP    2002-183004 A    6/2002
JP    2002-207652 A    7/2002
(Continued)

OTHER PUBLICATIONS

International Search Report from International Patent Application No. PCT/JP2016/061956, dated Jun. 21, 2016.

*Primary Examiner* — Cao H Nguyen
(74) *Attorney, Agent, or Firm* — Greer, Burns & Crain, Ltd.

(57) ABSTRACT

An information-link system is provided that allows an information provider to associate a predetermined link code with information from the provider, and that allows a user to directly access the information. The system includes an information-link device, an information-providing terminal, and a user terminal, each connected to each other via a network, and wherein the information-link device includes a link-code-management part, and a link-information-extraction part, the link-code-management part issues link codes in response to an information provider request, with each of the link codes having a predetermined fixed format, associates each of the link codes with a URL or a file storage location, and manages the associated link code and the URL or the storage location, and the link-information-extraction part extracts the URL or the location of the data file that has been
(Continued)

associated with the link code, based on the link code sent from the user terminal.

15 Claims, 6 Drawing Sheets

(51) Int. Cl.
*G06F 12/00* (2006.01)
*G06F 13/00* (2006.01)
*G06K 9/32* (2006.01)
*G06K 9/62* (2006.01)
*G06K 9/00* (2006.01)
*G06F 3/0482* (2013.01)
*G06F 3/0484* (2013.01)
*G10L 15/26* (2006.01)
*G10L 25/54* (2013.01)

(52) U.S. Cl.
CPC .......... *G06F 16/13* (2019.01); *G06F 16/9558* (2019.01); *G06K 9/325* (2013.01); *G06K 9/6202* (2013.01); *G06F 3/0482* (2013.01); *G06F 3/0484* (2013.01); *G10L 15/265* (2013.01); *G10L 25/54* (2013.01)

(58) Field of Classification Search
USPC .......................... 715/762–765, 740, 780, 851
See application file for complete search history.

(56) References Cited

U.S. PATENT DOCUMENTS

| | | | |
|---|---|---|---|
| 2002/0165916 A1 | 11/2002 | Kitamura | |
| 2017/0019497 A1* | 1/2017 | Fujiwara | ................ G06Q 10/06 |

FOREIGN PATENT DOCUMENTS

| | | | |
|---|---|---|---|
| JP | 2002-216003 | A | 8/2002 |
| JP | 2002-324020 | A | 11/2002 |
| JP | 2003-099348 | A | 4/2003 |
| JP | 2003-157340 | A | 5/2003 |
| JP | 2003-288364 | A | 10/2003 |
| JP | 2006-119825 | A | 5/2006 |
| JP | 2006-155598 | A | 6/2006 |
| JP | 2010-113501 | A | 5/2010 |
| JP | 2010-267071 | A | 11/2010 |
| JP | 2010-282241 | A | 12/2010 |

* cited by examiner

Fig. 7
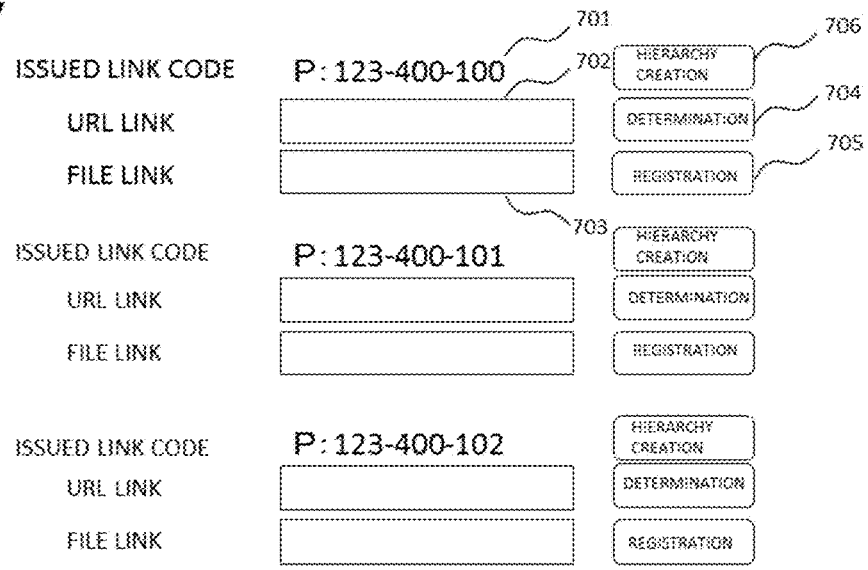
Fig. 8
LINK CODE MANAGEMENT TABLE
| LINK CODE 1 | LINK CODE 2 | URL | FILE STORAGE LOCATION |
|---|---|---|---|
| P:123-400-100 | | http//www.abc··· | |
| P:123-400-101 | | | C:¥Users¥Doc··· |
| P:123-400-102 | P:123-400-102-0 | http//www.xyz··· | |
| P:123-400-103 | P:123-400-102-1 | | C:¥Users¥Pic··· |
| P:123-400-104 | P:123-400-102-2 | http//www.xyy··· | |
| P:123-400-105 | | | C:¥Users¥Mov··· |
Fig. 9
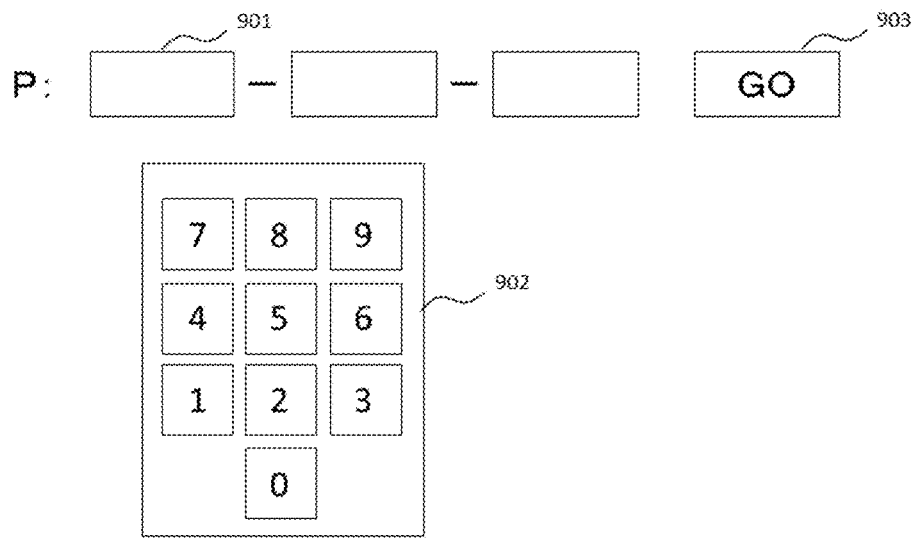

INFORMATION-LINK SYSTEM, INFORMATION-LINK PROGRAM, AND METHOD OF OPERATING THE INFORMATION-LINK SYSTEM

BACKGROUND

The present invention relates to an information-link system, an information-link program, and a method of operating the information-link system. More specifically, the invention relates to an information-link system, information-link program, and method of operating the information-link system, that allow a user to easily establish an information link that permits the user to directly access information from a variety of sources desired by the user.

In a society highly oriented toward information, an enormous amount of information is provided via various media and means, including the Internet. A variety of information is now easily obtainable through personal computers, smart phones, and other electronic devices, whereby whenever a user of such devices wants to obtain certain information, the user can easily do that. At the same time, as the amount of data provided by websites has increased, the websites generally include deep hierarchical structures, and their webpages provide many options from which a user must select, which compels a user to make much effort to reach the information that the user wants. Also, even on a website that displays sitemap information and that does not include a deep hierarchical structure, in order for a user to display the exact map information desired, the user must input all the necessary address information, including the names of the prefecture, the city, and so on.

A webpage displayed on the display screen of an electronic device of various types has an address called a uniform resource locator (URL), so that a user who wants information can display the webpage containing to the desired information by inputting the URL into an information device such as a personal computer. However, if a website has a deep hierarchical structure, the webpage located at a lower (deeper) level of the hierarchy tends to have a long URL, which renders the user's input work cumbersome.

Accordingly, in order to allow Internet users to easily access desired information, various search systems have been developed, such as a system that allows users to access information by simply inputting keywords relating to the desired information instead of inputting URLs. However, such search systems involve several problems. For example, in response to a keyword that has been input, the search system almost always provides multiple webpages, and, as a result, the user cannot easily reach the most-appropriate webpage. Or, even if the user successfully reaches the needed webpage, if the Webpage is located lower (deeper) in the hierarchy of a website, the user might need to go through various webpages on the website in order to reach the desired webpage. Therefore, such search systems do not necessarily allow users to directly access the information they want.

The URL is usually formed by a combination of multiple alphanumeric characters, and therefore inputting a long URL might require a user to make much effort and might induce errors in inputting the URL. In order to overcome such a problem, Patent Document 1 discloses methods and systems by which a unique simplified network address is assigned to a URL, so that inputting the simplified network address will generate the URL corresponding to the simplified network address, which permits a user to easily access a desired website. However, this simplified network address has some problems: inasmuch as the simplified network address does not have a fixed format, errors input an address are not easily detected; in addition, a simplified network address cannot be easily identified as such when the address is included in a document.

Patent Document 2 discloses a method for helping an Internet user to access target information without fail. By that method, inputting predetermined numerical data into an information terminal by a user generates the URL desired by the user. This method uses a correspondence table that includes numerical data associated with a URL, so that a user can obtain a desired URL by inputting predetermined numerical data, by which the convenience of the user is enhanced. However, by that method the relationship between the predetermined numerical data and the associated URLs is fixed; Patent Document 2 does not disclose how to issue the predetermined numerical data, how an information provider can associate the numerical data with the URLs, or how the information provider can update the association of the numerical data and the URLs.

PRIOR-ART DOCUMENTS

Patent Documents

Patent Document 1: Japanese Unexamined Patent Application Publication (Translation of PCT Application) No. 2001-522073
Patent Document 2: Japanese Unexamined Patent Application Publication No. 2002-324020

SUMMARY

Technical Problem

To overcome the above-mentioned problems of the prior-art systems, the present invention provides an information-link system, an information-link program, and a method of operating the information-link system, which together allow an information provider to easily associate a predetermined link code with information to be provided by the provider, or to easily update the information to be provided, and which allow a user who wants to obtain the provided information to easily and directly access the information.

Solution to the Problem

The information-link system of the present invention includes an information-link device, an information-providing terminal, and a user terminal, each of which is connected to each other via a network, and wherein
  the information-link device includes a link-code-management part, a storage part, and a link-information-extraction part,
  the link-code-management part
    issues link codes in response to a request from an information provider, with each of the link codes having a predetermined fixed format,
    associates each of the link codes with a URL or a storage location of a data file, and
    manages the associated link code and the URL or the storage location of the data file, based on link information that includes the URL and the storage location of the data file, the link information being sent from the information-providing terminal, the storage part stores the data file and management information that is managed by the link-code-management part, and the link-information-extraction part
   extracts the URL or the location of the data file that has been associated with the link code, based on the link code sent from the user terminal, and
   allows the user terminal to display the webpage of the URL or the data file, wherein the URL or the location of the data file, which has been associated with the link code, is changed in response to the request from the information provider,
wherein multiple link codes are issued to the information provider and are hierarchically organized in response to the request from the information provider,
wherein the hierarchically organized link codes are associated with the URLs or the locations of the data files, using the link codes that are higher in the link-code hierarchy and the branch numbers, and
wherein, if the link code that is sent from a user terminal is higher in the link-code hierarchy, the information-link device allows the user terminal to display an input field of the branch number.

The user terminal preferably includes
an image-acquisition part that acquires an image that is on a tangible object and that includes the link code, and
an extraction part that recognizes the link code in the image and extracts the link code from the image,
wherein the link code that is to be sent from the user terminal has been displayed on the tangible object.

The user terminal preferably includes
an image-acquisition part that acquires an image,
a registration part that associates a specific image with an optional number and stores the associated image and number, and
a discrimination part that compares the acquired image with the specific image stored in the registration part, and that extracts a number associated with the specific image when the acquired image is determined to be equivalent to the specific image,
wherein the link code that is to be sent from the user terminal is configured in advance to include the numbers that are to be extracted by the discrimination part.

The user terminal preferably includes a voice-recognition part that recognizes voices, and that converts the numbers of the link code voiced by a user into numeric data that form a link code that the user terminal sends to the information-link system, and the link code that is to be sent from the user terminal is configured in advance to include the number data.

The user terminal preferably includes a sound-recognition part that recognizes sounds and that includes
a recognition unit that recognizes sounds,
a registration unit that associates a specific sound with an optional number and stores the associated sound and number, and
a discrimination unit that compares a recognized sound with specific sounds stored in the registration unit, and that extracts a number associated with a specific sound when the recognized sound is determined to be equivalent to the specific sound, and
wherein the link code that is to be sent from the user terminal is configured in advance so as to include the numbers that are to be extracted by the discrimination unit.

The user terminal preferably includes an action-recognition part that includes
a recognition unit that recognizes a user's action,
a registration unit that associates a specific user's particular action with an optional number and stores the associated action and number, and
a discrimination unit that compares a recognized action with the specific actions stored in the registration unit, and that extracts the number associated with a specific action when the recognized action is determined to be equivalent to the specific action, and
wherein the link code that is to be sent from the user terminal is configured in advance to include the numbers that are to be extracted by the discrimination unit.

The program of the present invention is used in an information-link device of an information-link system that includes an information-link device, an information-providing terminal, and a user terminal, each of which is connected with each other via a network,
wherein the program controls a link-code-management part so that the link-code-management part
   issues link codes in response to a request from an information provider, with each of the link codes having a predetermined fixed format,
   associates each of the link codes with the URL or a location of a data file, based on link information that includes a URL and the storage location of a data file, which is sent from the information-providing terminal, and
   manages the associated link codes and the link information,
wherein the program stores, in a storage part, the data file and management information, that is managed by the link-code-management part,
wherein the program controls a link-information-extraction part so that the link-information-extraction part
   extracts the URL or the location of the data file that has been associated with the link code, based on the link code sent from the user terminal, and
   allows the user terminal to display the webpage of the URL or the data file,
wherein the link codes are hierarchically organized in advance, and the hierarchically organized link codes are associated with the URLs or the locations of data files, using the link codes that are higher in the link-code hierarchy and the branch numbers, and
wherein the program controls the information-link device in such a way that, if a link code that is sent from the user terminal is higher in the link-code hierarchy, the information-link device allows the user terminal to display, on a display part of the user terminal, an input field of the branch number.

The program of the present invention is used in a user terminal of an information-link system that includes an information-link device, an information-providing terminal, and a user terminal, each of which is connected with each other via a network,
wherein the program controls
   an image-acquisition part so that the image-acquisition part acquires an image that is on a tangible object,
   the user terminal so that the extraction part
      recognizes the characters included in the image data that has been acquired,
      extracts a character string as a link code if the recognized characters include a character string that is configured in a predetermined fixed format, and
      sends the extracted link code to the information-link device,
wherein the link codes are hierarchically organized in advance and are associated with URLs or locations of the data files, using the link codes that are higher in the link-code hierarchy and the branch numbers, and wherein the program controls the user terminal in such a way that, if the link code is higher in the link-code hierarchy, the user terminal displays on a display part of the user terminal an input field of the branch number.

A method of operating the information-link system of the present invention, with the system including an information-link device, an information-providing terminal, and a user terminal, each of which is connected with each other via a network, includes

- a step in which the information-link device issues link codes, each of which has a predetermined fixed format;
- a step in which the information-link device receives, from the information-providing terminal, link information that includes URLs and the storage locations of data files that correspond to the link codes, and registers the link information;
- a step in which, based on the registered link information, the information-link device associates the link codes with the URLs or the locations of the data files, and stores the associated link codes and the URLs or the locations of the data files; and
- a step in which the information-link device receives the link codes from the user terminal, extracts the URLs or the locations of the data files associated with the link codes, and displays on the user terminal the webpages of the URLs or the data files, wherein multiple link codes are simultaneously issued by the information-link device, wherein the step for registering the link information is done to the link codes corresponding to the received link information, among the multiple link codes, and wherein there exists a further step in which the information-link device receives, from the information-providing terminal, the link codes that are higher in the link-code hierarchy and the branch numbers, and configures the multiple link codes in a hierarchical structure, wherein the hierarchically organized link codes are associated with the URLs or the locations of the data files, using the link codes that are higher in the link-code hierarchy and the branch numbers, and wherein, if the link code that is sent from the user terminal is higher in the link-code hierarchy, the information-link device allows the user terminal to display an input field of the branch number.

The method of operating the information-link system further includes

- a step in which, if the information-link device receives link information that includes a new URL or a new location of a data file, and that corresponds to the stored link code that has been associated with the URL or the location of the data file, the new link information is registered at the information-link device as updated link information, and
- a step in which, based on the updated link information, the information-link device updates and stores the associated link code and the URL or the location of the data file.

Preferably, the link code sent from a user terminal is extracted by the user terminal from the image data on a tangible object, the image data having been acquired by the user terminal. Also preferably, when the image acquired by the user terminal is determined by a discrimination part to be equivalent to a specific image, the link code that is to be sent from the user terminal is configured so as to include optional numbers that have been associated with the specific image. In addition, the link code that is to be sent from the user terminal preferably includes number data that has been converted from a voice recognized by the user terminal.

Preferably, when a sound recognized by the user terminal is determined to be equivalent to a specific sound that has been registered at a registration unit of the system, the link code that is to be sent from the user terminal includes optional numbers that have been associated with the specific sounds. Also preferably, when a specific user's action recognized by the user terminal is determined to be equivalent to a specific action that has been stored at a registration unit, the link code that is to be sent from the user terminal is configured so as to include optional numbers that have been associated with the specific actions.

Advantageous Effects of the Invention

The information-link system according to the present invention allows an information provider to easily associate a predetermined link code with a URL or a storage location of an image or a document file, and to update the information that is associated with the link code. Also, the information-link system allows a user who wants to obtain information to directly access the desired information by inputting a link code. Thus, the present information-link system provides an efficient system for exchanging information between an information provider and users of the information. Also, the information-link system according to the present invention allows an information provider to apply a predetermined link code on a tangible object, such as a document or a physical object, to provide access information without using special equipment having communication means.

In addition, the information-link system according to the present invention uses a predetermined link code formed in a specific format, so that a user can easily recognize the link code that is on a document or an object in a fixed format, and can easily extract the link code even if the link code is expressed as an image. Thus, the user can obtain desired information without making much effort.

BRIEF DESCRIPTIONS OF THE DRAWINGS

FIG. 7 is an illustration of an example of an input screen of an information-link system for inputting link information according to an embodiment of the present invention.

FIG. 8 is an illustration of an example of a link-code management table of an information-link system according to an embodiment of the present invention.

FIG. 9 is an illustration of an example of an input screen of an information-link system for inputting a link code according to an embodiment of the present invention.

DETAILED DESCRIPTION

Figure 1:
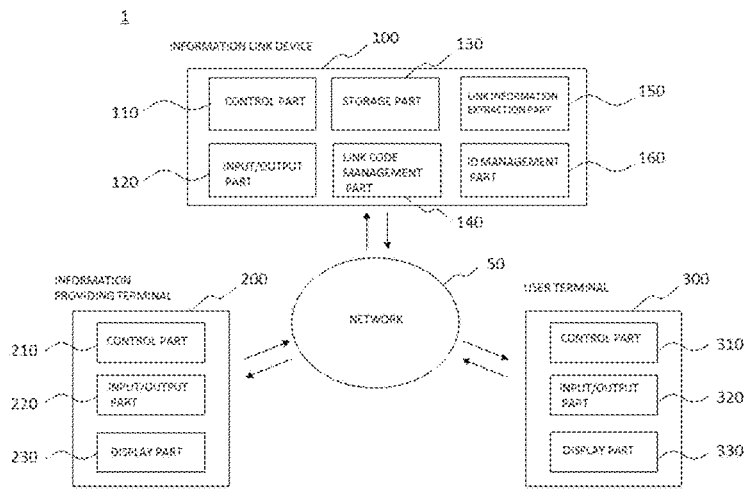
FIG. 1 is a schematic diagram that shows the configuration of an information-link system according to the First Embodiment of the present invention.

The present invention will be specifically explained below with reference to the embodiments of the invention and the attached drawings, which together show how the information-link system of the present invention is operated. FIG. 1 is a schematic diagram that shows the configuration of an information-link system according to the First Embodiment of the present invention. As shown in FIG. 1, the Information-Link System 1 includes an information-link device 100, an information-providing terminal 200, and a user terminal 300, each of which is connected with each other via a network 50.

The information-link device 100 operates as follows: (1) in response to a request that is submitted by an information provider and that is sent from an information-providing terminal 200, the device 100 issues multiple link codes, each of which has a fixed format; (2) the device 100 receives link information for a document or an image, with which the information provider associates each of the issued link codes, and saves the link information; (3) based on a link code sent from a user terminal, the device 100 extracts link information associated with the link code; and (4) the device 100 displays on the user terminal information that includes the document or image that corresponds to the link information. In summary, the device 100 provides a user with information that is provided by an information provider via a link code that is configured so as to have a fixed format.

The network 50 may be a wide-area network such as the Internet or a local-area network. As shown in FIG. 1, the information-link device 100 includes a control part 110, an input/output part 120, a storage part 130, a link-code-management part 140, a link-information-extraction part 150, and an ID-management part 160. The input/output part 120, by communicating with the information-providing terminal 200 and the user terminal 300 via the network 50, is able to send data to, and to receive data from, those terminals.

If the link-code-management part 140 accepts a request to issue a link code that has been submitted by the information provider and been sent from the information-providing terminal 200, the link-code-management part 140 issues multiple link codes that are exclusively assigned to that information provider. The link code is an intermediary used for transferring information, and is expressed by a fixed format, for example, "P:123-400-000," which consists of an initial Romanized letter and 3 three-digit numbers, with a hyphen between the first and second sets of three-digit numbers and between the second and third sets of three-digit numbers. In this format, the numbers constituting each three-digit number part are variable so as to define a unique link code. Thus, one link code is substantively determined by 9 numbers. According to an embodiment of this invention, the link-code-management part 140 issues 10 serial link codes in response to an information provider's request to issue link codes. The number of the link codes issued is not limited to 10, but any number, such as 1 or 100, of link codes may be issued, depending on the embodiment.

If the link-code-management part 140 accepts an information provider's request, sent from an information-providing terminal 200, to register link information, the link-code-management part 140 extracts a link code that has been issued to that information provider, and sends the extracted code to that provider's information-providing terminal 200. Thus, the link-code-management part 140 manages the correspondence relationship between the information provider and the link codes that have been issued, so that the link-code-management part 140 can extract the issued link codes that should be sent to the information provider. The information provider's information used by the link-code-management part 140 is basic information relating to the information provider, such as the information provider's name and email address, that was sent to the information-link device 100 from the information-providing terminal 200 when the information provider initially registers at the information-link device 100 so as to commence the use of the information-link system.

Also, based on the link information sent from the information-providing terminal 200, including URLs or the locations of data files, the link-code-management part 140 associates link codes with the URLs or the locations of the data files, and manages the relationship between the link codes and the URLs or the locations of the data files. The association of the link codes with the URLs or the locations of the data files is managed by creating a link-code management table as explained later with reference to FIG. 8. If the link information is a URL, the URL that is selected by the information provider and that is associated with the link code is entered into an applicable field for the URL in the link-code management table. If the link information is the storage location of a data file, (1) the data file is uploaded from the information-providing terminal 200 to the information-link system, and is saved in the storage part of the information-link device 100, and (2) the location of the data file is entered into an applicable field for the file location in the link-code management table.

The association of a link code with a URL or the location of a data file can be reentered as needed in response to a request from an information provider. The rewriting procedure is as follows: (1) if the link information sent from an information-providing terminal 200 is associated with a link code that has already been associated with any link information, and (2) if the link information sent from the information-providing terminal 200 differs from the link information that has been associated with the link code in the link-code management table stored in the storage part, although the link code in that table is the same as the link code sent from the information-providing terminal 200, the link-code-management part 140 replaces the link information entered in the applicable field of the link-code management table stored in the storage part by the link information sent from the information-providing terminal 200, and stores the link information that has been sent. The storage part 130 stores management information, including (1) the basic information concerning the information provider, and (2) the link-code management table that is managed by the link-code-management part 140.

Link-information-extraction part 150 extracts the URL or the location of a data file using a link code that is sent from a user terminal 300, the URL or the location of the data file being associated with the link code sent from the user terminal 300, and allows the user terminal 300 to display the webpage for that URL or the data file. In using a link code, and in extracting a URL or the location of a data file that is associated with a link code, the link-code management table, which the link-code-management part 140 manages and stores in the storage part 130, may be used. When an information provider initially registers at the information-link device 100 so as to commence the use of the information-link system, the information-link device 100 receives basic information concerning the information provider, including the information provider's name and e-mail address, from the information-providing terminal 200, and the ID-management part 160 issues to/for the information provider a unique member ID. The ID-management part 160 associates the basic information concerning the information provider with the information provider's unique member ID, and manages that information. The ID-management part 160 stores the associated information in the storage part 130 as ID-management information.

Also, when a registered information provider logs in to the information-link system, for example, to register link information, the ID-management part 160 identifies the information provider by using the member ID sent from the information providing terminal 200, and by referring to the ID-management information stored in the storage part 130. By identifying the information provider in this way, the link-code-management part 140 can extract the link code that has already been issued to the information provider, as explained above.

When the information provider initially registers, the information provider may set a password that will be sent to the information-link device 100 from the information-providing terminal 200 along with the basic information concerning the information provider. The ID-management part 160 associates the basic information concerning the information provider, the unique member ID of the information provider, and the password with each other so as to manage them, and stores the associated information in the storage part 130 as ID-management information. The system may be configured so that when a registered information provider logs in to the information-link system, for example, to register link information, the ID-management part 160 compares the member ID and the password sent from the information-providing terminal 200 with the ID-management information that has been stored in the storage part 130, and if the combination of the member ID and the password corresponds to the stored ID-management information, the ID-management part 160 authenticates the log-in of the information provider.

The control part 110 executes the program that controls each component of the information-link device 100 so that each component functions as explained above, whereby the control part 110 controls the information-link device 100. As shown in FIG. 1, the information-providing terminal 200 includes a control part 210, an input/output part 220, and a display part 230. The information-providing terminal 200 may further include a storage part (not shown) that stores URLs and data files. A personal computer may be used for realizing the functions of these components.

The user terminal 300 includes a control part 310, an input/output part 320, and a display part 330. The input/output part 320 includes an input unit such as a keyboard or a touch panel, along with a transmission/reception unit by which data is transmitted to, and received from, the information-link device 100 via the network. If a user wants to obtain information associated with a link code, the user inputs the link code from the input unit and transmits the link code to the information-link device 100. Then, as is explained above, the URL of a webpage or the location of a data file that is associated with the link code that has been transmitted by the user is extracted by the link-information-extraction part 150, and the webpage or the data file is sent to the user terminal 300 so as to be displayed on the display part 330.

The information provider may apply—on various tangible objects, including documents, products, and objects displayed in exhibitions—registered link codes that have been associated with link information, so that the information provider can disseminate the registered link codes widely. Thus, a user can recognize a link code that has been applied to a tangible object, so that the user can directly obtain desired information by inputting the 9 numbers (consisting of three sets of 3 numbers each) that are included in the link code that is associated with an object that is of interest to the user. The user terminal 300 can be a personal computer, a tablet-style personal computer, or a smartphone.

Figure 2:
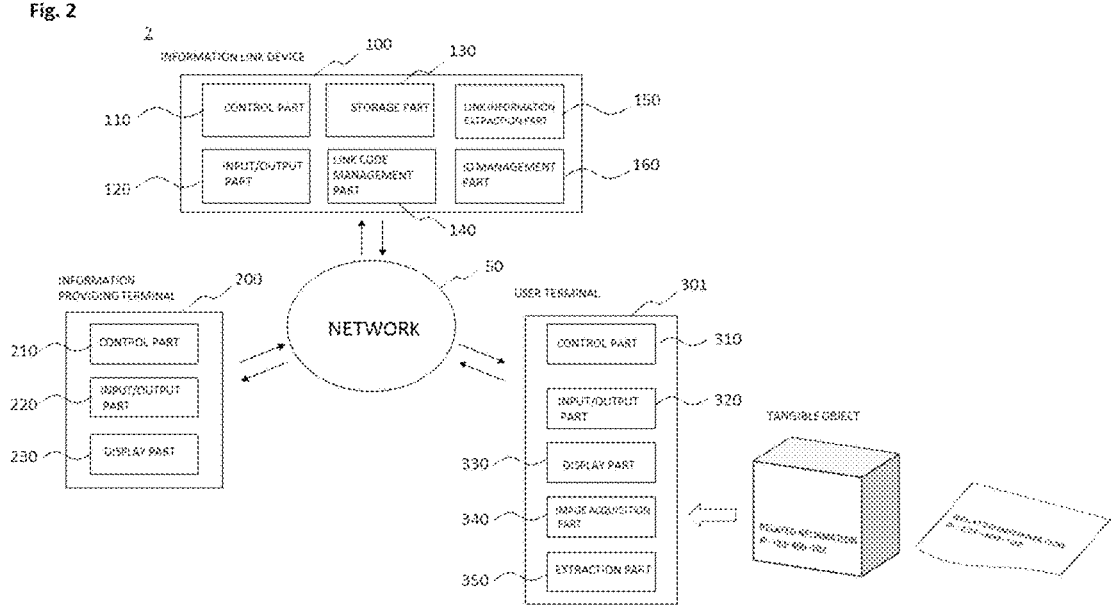
FIG. 2 is a schematic diagram that shows the configuration of an information-link system according to the Second Embodiment of the present invention.

FIG. 2 is a schematic diagram that shows the configuration of an information-link system according to the Second Embodiment of the present invention. As shown in FIG. 2, the Information-Link System 2 includes an information-link device 100, an information-providing terminal 200, and a user terminal 301, each of which is connected with each other via a network 50. The respective components of the information-link device 100 and the information-providing terminal 200 are the same as those of the information-link device 100 and the information-providing terminal 200 included in the Information-Link System 1 shown in FIG. 1. The user terminal 301 differs from the user terminal 300 in that the user terminal 301 further includes an image-acquisition part 340 and an extraction part 350. The explanation below will focus on how the Information-Link System 2 differs from the Information-Link System 1, without explaining the parts shared by the two systems.

The image-acquisition part 340 obtains the image of a tangible object that includes a link code as image data. The extraction part 350, by recognizing the link code as characters, extracts the link code from the image data that the image-acquisition part 340 has obtained. Because the link code has a fixed format such as "P:123-400-000," the link code can easily be recognized as such even if the link code is embedded in a sentence. The link code that has been recognized and extracted is displayed on a display part 330 of the user terminal 301. If the link code is correctly recognized, the user can, by selecting or pressing down a "Send" button, obtain the information the user desires from the information-link device 100.

Thus, because the user terminal 301 includes the image-acquisition part 340 and the extraction part 350, it is unnecessary for a user to input a link code via a keyboard. As a result a user can promptly and directly obtain desired information by operating only a "Send" button. As a result, the user terminal 301 can be a tablet-style personal computer or a smartphone that includes a camera.

In the above-explained example of this embodiment, the link code that is recognized and extracted is displayed on the display part 330, and the user selects or presses down the "Send" button. However, in another example of this embodiment, the system may be configured so that, if the user terminal 301 recognizes a link code, the user terminal 301 sends the recognized link code to the information-link device 100, whereby a user obtains the desired information. Because of this configuration, the user needs only to hold the user terminal 301 over the tangible object to obtain the information associated with the link code that is on the tangible object.

If the information that is associated with a tangible object is not limited to one source, and multiple link codes are recognized in and extracted from an image that the user terminal 301 has acquired, the system may be configured so that the user terminal 301 allows all the extracted link codes to be displayed on the display part 330, so that the user selects one of the displayed link codes, and selects or presses down the "Send" button to obtain from the information-link device 100 the information desired.

Figure 3:
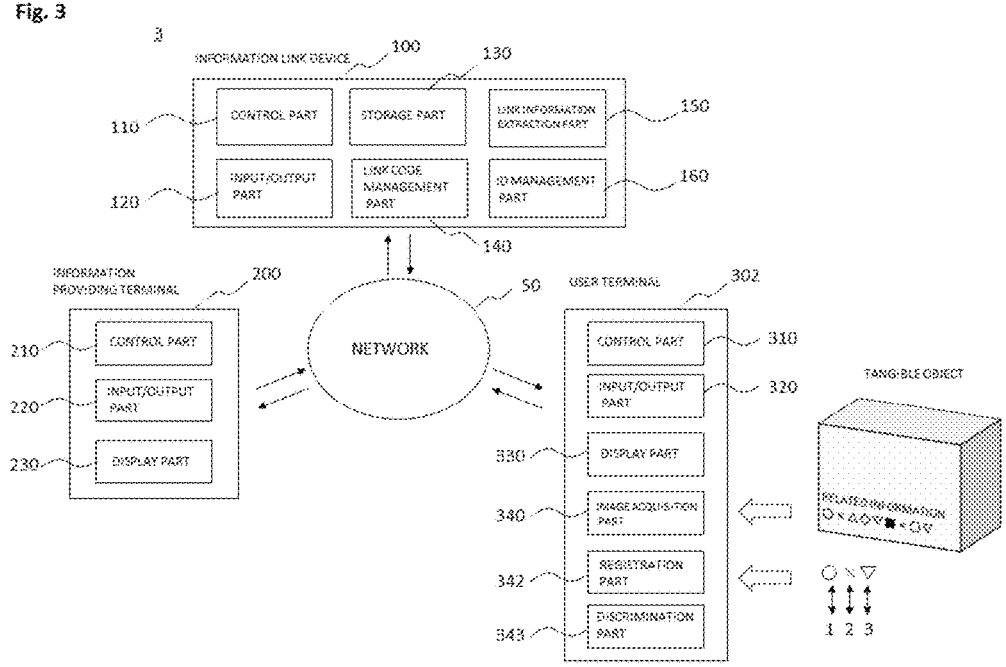
FIG. 3 is a schematic diagram that shows the configuration of an information-link system according to the Third Embodiment of the present invention.

FIG. 3 is a schematic diagram that shows the configuration of an information-link system according to the Third Embodiment of the present invention. As shown in FIG. 3, this Information-Link System 3 includes an information-link device 100, an information-providing terminal 200, and a user terminal 302, each of which is connected with each other via a network 50. The respective components of the information-link device 100 and the information-providing terminal 200 are the same as those of the information-link device 100 and the information-providing terminal 200 included in the Information-Link Systems 1 and 2. The user terminal 302 differs from the user terminal 301 in that the user terminal 302 includes a registration part 342 and a discrimination part 343 in place of the extraction part 350.

The registration part 342 associates specific images with optional numbers, and saves the associated images and numbers. The specific image must be an image that retains a recognizable characteristic after the image has been acquired by the image-acquisition part 340 of the user terminal 302. The recognizable characteristic may be a shape, a color, and so on. The image may be a symbolic shape such as "○," "x," or "Δ," or may be a colored shape, such as a red "○", or the same shape "○" in blue. In addition to such symbolic shapes, the image may be a photograph, a picture, or other visual representation. The registration part 342 associates a specific image with an optional number, and saves the associated specific image and number. For example, the registration part 342 associates "○" with 1, "x" with 2, and "Δ" with 3, and saves each pair as a respective associated image and number.

The discrimination part 343 compares the image acquired by the image-acquisition part 340 with a specific image stored in the registration part 342, and determines whether the acquired image is equivalent to the specific image stored in the registration part 342. If the acquired image is determined to be equivalent to the specific stored image, the number associated with the specific stored image is extracted. As is in the examples above, if "○" is associated with 1, and if "x" is associated with 2, and if "Δ" is associated with 3, and if those combinations are saved as such in the registration part 342, then if the image acquired by the image-acquisition part 340 is "Δ," the number "3" is extracted.

The registration part 342 can store 10 specific images, each of which has a different characteristic, with each specific image being associated with a number from 0 to 9. When a user acquires images corresponding to these stored specific images by the image-acquisition part 340, 9 numbers (consisting of three sets of 3 numbers each) that are associated with the respective specific images are obtained, whereby one link code can be defined. That is, without directly inputting 9 numbers, a link code is created by acquiring an image. As shown in FIG. 3, when a row of symbols on a tangible object is sequentially captured as images in the user terminal 302, the numbers associated with the respective symbols are extracted, whereby a link code is formed. By sending this link code to the information-link device 100, the user can obtain from the information-link device 100 the information desired.

Figure 4:
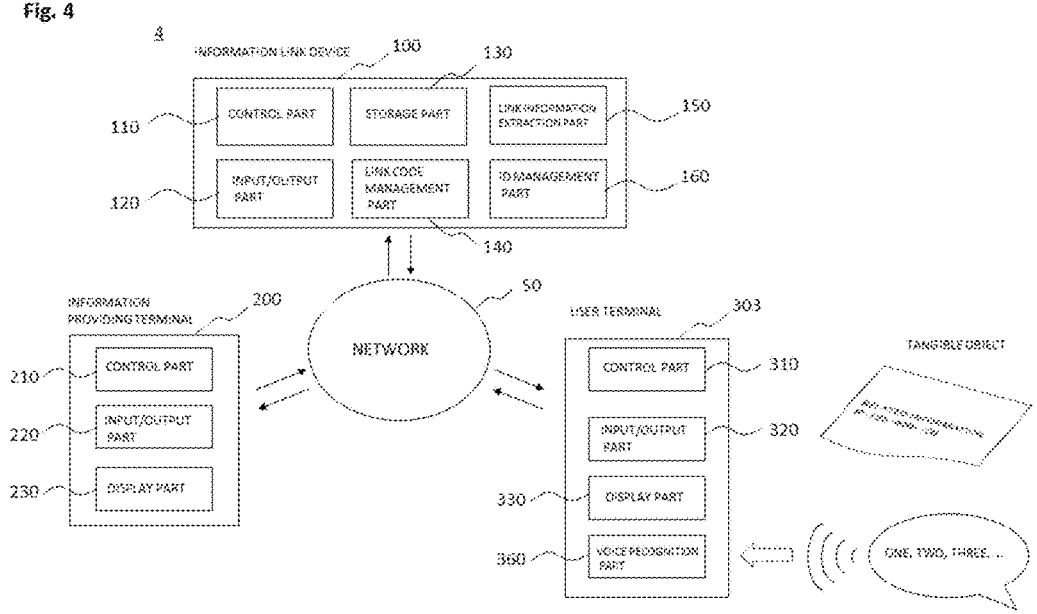
FIG. 4 is a schematic diagram that shows the configuration of an information-link system according to the Fourth Embodiment of the present invention.

FIG. 4 is a schematic diagram that shows the configuration of an information-link system according to the Fourth Embodiment of the present invention. As shown in FIG. 4, the Information-Link System 4 includes an information-link device 100, an information-providing terminal 200, and a user terminal 303, each of which is connected with each other via a network 50. The respective components of the information-link device 100 and the information-providing terminal 200 are the same as those of the information-link device 100 and the information-providing terminal 200 that are included in the Information-Link Systems 1-3. The user terminal 303 differs from the user terminal 300 in that the user terminal 303 further includes a voice-recognition part 360.

The voice-recognition part 360 recognizes voices and converts into numerical data the number of a link code being voiced, so as to form a link code that the user terminal 303 sends to the information-link device 100. That is, as is shown in FIG. 4, if a user reads out—in such a manner as "one, two, three" and the like—the number of a link code that is on a tangible object, the voice-recognition part recognizes the voiced content as numbers, and converts the read-out numbers into the number data of "1," "2," and "3." Thus, the number of the link code that is read out by the user is converted into the number data so as to represent the link code. By sending to the information-link device 100 a link code that is formed like this, the user can obtain desired information from the information-link device 100. Accordingly, the Information-Link System 4 allows the user to obtain desired information without inputting characters through a keyboard or other device.

The link code that is on a tangible object may be accompanied by a code entered in Braille. This allows a user who is weak-sighted to read out the link code, so that such a user can obtain information in audio form from the information-link device 100.

Figure 5:
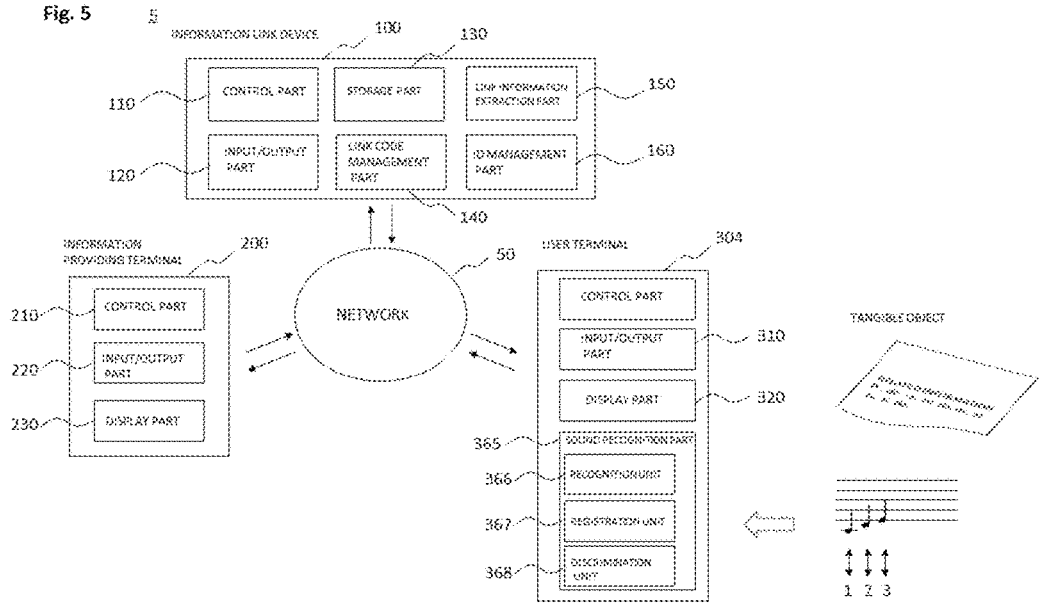
FIG. 5 is a schematic diagram that shows the configuration of an information-link system according to the Fifth Embodiment of the present invention.

FIG. 5 is a schematic diagram that shows the configuration of an information-link system according to the Fifth Embodiment of the present invention. As shown in FIG. 5, an Information-Link System 5 includes an information-link device 100, an information-providing terminal 200, and a user terminal 304, each of which is connected with each other via a network 50. The respective components of the information-link device 100 and the information-providing terminal 200 are the same as those of the information-link device 100 and the information-providing terminal 200 included in the Information-Link Systems 1-4. The user terminal 304 differs from the user terminal 300 in that the user terminal 304 further includes a sound-recognition part 365.

The sound-recognition part 365 includes (1) a recognition unit 366 that recognizes sounds, (2) a registration unit 367 that associates a specific sound with an optional number and that stores the sound and the associated number, and (3) a discrimination unit 368 that compares a recognized sound with specific sounds stored in the registration unit 367, so as to determine whether a recognized sound is equivalent to a specific stored sound. If a recognized sound is determined to be equivalent to a specific stored sound, the discrimination unit 368 extracts the number associated with the specific sound. This specific sound must be a sound that has a recognizable characteristic recognized by the recognition unit 366 of the sound-recognition part 365, which can be a pitch, a length, a tone, or the like. The sound may be any sound, including a sound generated by a musical instrument, a sound generated by using an object, or the sound of a voice.

The registration unit 367 associates a specific sound with an optional number, and saves the sound and the associated number. For example, if a musical scale is used, the registration unit 367 associates "do" with 1, "re" with 2, and "mi" with 3, and saves those associated sounds and numbers. The discrimination unit 368 compares each of the sounds recognized by the recognition unit 366 with specific sounds stored in the registration unit 367, so as to determine whether a recognized sound is equivalent to a specific sound stored in the registration unit 367. If a recognized sound is determined to be equivalent to such a specific sound, the number associated with the specific sound is extracted. As in the examples above, if "do" is associated with 1, and "re" is associated with 2, and "mi" is associated with 3, and they are saved as such, and if the sound recognized by the recognition unit 366 is "re," "2" is extracted.

The registration unit 367 can store 10 specific sounds, each of which has a different characteristic, by associating each specific sound with a number from 0 to 9. If the user inputs the sounds corresponding to these stored specific sounds through the recognition unit 366, so that the user causes the recognition unit 366 to recognize the inputted sounds, 9 numbers (consisting of three sets of 3 numbers each") that are associated with the respective specific sounds are obtained, whereby one link code can be defined. That is, without directly inputting 9 numbers, a link code is created by having the recognition unit 366 recognize the inputted sounds. As shown in FIG. 5, when the user causes the user terminal 304 to sequentially recognize as sounds a row of pitch names displayed on a tangible object, the numbers associated with the respective pitch names are extracted, whereby a link code is formed. By sending this link code to the information-link device 100, the user can obtain desired information from the information-link device 100.

Figure 6:
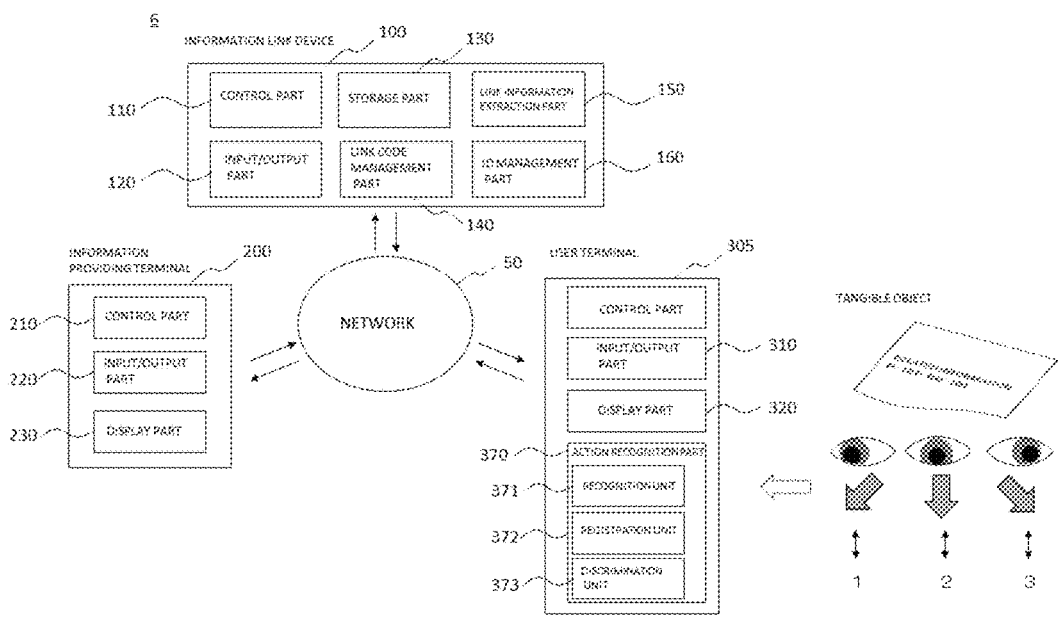
FIG. 6 is a schematic diagram that shows the configuration of an information-link system according to the Sixth Embodiment of the present invention.

FIG. 6 is a schematic diagram that shows the configuration of an information-link system according to the Sixth Embodiment of the present invention. As shown in FIG. 6, the Information-Link System 6 includes an information-link device 100, an information-providing terminal 200, and a user terminal 305, each of which is connected with each other via a network 50. The respective components of the information-link device 100 and the information-providing terminal 200 are the same as those of the information-link device 100 and the information-providing terminal 200 included in the Information-Link Systems 1-5. The user terminal 305 differs from the user terminal 300 in that the user terminal 305 further includes an action-recognition part 370.

The action-recognition part 370 includes (1) a recognition unit 371 that recognizes a user's actions, (2) a registration unit 372 that associates a specific user's particular action with an optional number and stores the associated action and number, and (3) a discrimination unit 373 that compares a recognized action with specific actions stored in the registration unit 372, so as to determine whether a recognized action is equivalent to a specific stored action. If a recognized action is determined to be equivalent to a specific stored action, the registration unit 372 extracts the number associated with the specific stored action. The specific stored action must be an action that retains a characteristic that the recognition unit 371 of the user terminal 305 can recognize, such a fixed posture, a fixed position, or a gesture. For example, the characteristic may be the form of a hand in which a certain finger is pointing, or a gesture in which a finger has been moved in a given direction.

The registration unit 372 associates a specific action with an optional number, and saves the associated action and number. For example, by using a movement of a user's eyes, the registration unit 372 associates "the movement of the eyes from the center to the lower-left direction" with 1, "the movement of the eyes from the center to the downward direction" with 2, or "the movement of the eyes from the center to the lower-right direction" with 3, and saves those associated actions and numbers. The discrimination unit 373 compares each action recognized by the recognition unit 371 with specific actions stored in the registration unit 372, so as to determine whether a recognized action is equivalent to a specified action stored in the registration unit 372. If a recognized action is determined to be equivalent to a specific stored action, the discrimination unit 373 extracts the number associated with the specific stored action. As is in the examples above, when "the movement of the eyes from the center to the lower-left direction" is associated with 1, and that association is stored as such, "the movement of the eyes from the center to the downward direction" is associated with 2, and that association is stored as such, "the movement of the eyes from the center to the lower-right direction" is associated with 3, and that association is stored as such, and the action recognized by the recognition unit 371 is "the movement of the eyes from the center to the lower-left direction," "1" is extracted.

The registration unit 372 can store 10 specific actions, each of which has a different characteristic, by associating each specific action with a number from 0 to 9. If the user inputs, through the recognition unit 371, an action corresponding to a stored specific action, so that the user causes the recognition unit 371 to recognize the inputted action, 9 numbers (consisting of three sets of 3 numbers each) that are associated with a respective specific action are obtained, whereby one link code can be defined. That is, without directly inputting 9 numbers, a link code is created by having the recognition unit 371 recognize an inputted action. As shown in FIG. 6, when a user causes the user terminal 305 to sequentially recognize as an action a link code displayed on a tangible object, the numbers associated with that action are extracted, whereby a link code is formed. By sending this link code to the information-link device 100, the user can obtain from the information-link device 100 the information desired.

As is explained above, various types of input means are used at the user terminal of the information-link system according to the present invention. These various types of input means are contrived so as to simplify the user's input of link codes, or to assist a user who is not able to input a link code by hand due to a disease, an injury, or the like. By using the various input means, such a user can easily obtain desired information via the link codes. Although, in the embodiments discussed above, each embodiment is provided with a specific input means at the user terminal, a user terminal may combine a variety of different input means.

FIG. 7 shows an example of an input screen of an information-providing terminal for inputting link information in an information-link system according to an embodiment of the present invention. As shown in FIG. 7, the input screen of the link information includes (1) already-issued link codes 701 that have been sent from an information-link device 100 in response to a request from an information provider to register link information, and (2) input fields 702, 703 for inputting the information that is to be associated with the respective link codes. Multiple link codes are issued in response to a request from the information provider. The example shown in FIG. 7 includes three link codes among all of the issued multiple link codes. If the link information is a URL, the information provider inputs the URL into the URL link field 702 and selects the determination button 704, so that the inputted URL is sent to the information-link device 100.

If the link information is a file link, the information provider inputs the storage destination of the data file into a file-link field 703. The storage destination of the data file may be a storage part of the information-providing terminal or a storage destination in an external memory unit that is connected to the information-providing terminal. The storage destination of the data file may be designated by selecting the registration button 705. If the registration button 705 is selected, the hierarchical structure that indicates the location of the file on the information-providing terminal or on the external memory unit connected to the information-providing terminal is shown on another screen. If the data file to be linked in the hierarchical structure is selected, the storage destination for the data file is displayed in the file-link field 703. If the storage destination of the data file is input into the file-link field 703, selecting the determination button 704 allows the data file to be linked to be uploaded to the information-link device 100, the data file being stored in the storage part of the information-link device 100. In order to upload the file, a file-transfer program based on a file transfer protocol (FTP) is usually required. Such a program may be sent to the information-providing terminal from the information-link device 100 along with a member ID when an information provider initially registers.

The link information associated with the link code registered at the initial registration is replaceable at any time in response to a request from the information provider. Specifically, if the information provider inputs—into the URL link field 702 or the file-link field 703 corresponding to that issued link code—new link information to be associated with an issued link code, and selects the determination button, this link information is sent to the information-link device 100, and the link information stored at the information-link device 100 is replaced by this new link information. Also, the link information associated with the link code is not limited to the URL of a webpage or the storage location of a data file or the data file that is created by the information provider, but the link information associated with the link code may be the URL of a webpage or the storage location of a data file or the data file that is created by a party other than the information provider.

The information provider can optionally select a link code among the multiple link codes initially issued, and can associate the selected link code with a URL or the storage location of a file. Also, multiple link codes can be hierarchically organized according to a request from an information provider. If a tangible object is to be associated with two types of information, such as a commentary and a picture regarding the production of a broadcast program, the two types of information may be independently associated with two link codes. In such a case, in order for a user to obtain the two types of information, the user is required to input the respective 9 numbers (consisting of three sets of 3 numbers each) of both link codes. The hierarchical-organization technique uses branch numbers to designate several types of information that are related to each other. As shown in FIG. 7, after link information is input into the field for a URL or for a file link, and a hierarchy-creation button 706 is selected, another screen opens. By inputting both a link code that is higher in the link-code hierarchy and a branch number into the applicable field, the link codes are hierarchically organized.

FIG. 8 shows an example of a part of a link-code management table of an information-link system according to an embodiment of the present invention. A link-code-management part of an information-link device associates a link code based on an URL or the storage location of a data file sent from an information-providing terminal—with the URL or the location of the data file, so as to manage the associated link code and the URL or location, and stores the associated link code and the URL or location information in a storage part as a link-code management table. As shown in FIG. 8, the link-code management table includes fields for the link code 1 into which link codes are input, fields for the URL into which the URLs that are associated with the link codes are input, and file-storage location fields into which file-storage-location information is input, and further includes fields for the link code 2 into which hierarchically organized link codes are input. The link-code management table may also include basic information concerning the information provider.

If the hierarchical organization of the link codes as shown in FIG. 7 is made, the link code that is higher in the link-code hierarchy and a branch number is entered into the fields for the link code 2. FIG. 8 shows that the link code P:123-400-103 is lower in the link-code hierarchy than is P:123-400-102, and the branch number is 1. Likewise, the link code P:123-400-104 is lower in the link-code hierarchy than is P:123-400-102, and the branch number is 2. This link-code hierarchical organization is made such that, for example, after the link code P:123-400-103 is input, the hierarchy-creation button 706 shown in FIG. 7 is selected, and the link code P:123-400-102 that is higher in the link-code hierarchy and the branch number 1, are inputted. At the same time, the branch number 0 is assigned to the link code P:123-400-102, so that the link code with the branch number 0 is entered into the applicable field for the link code 2.

FIG. 9 shows an input screen of a user terminal as an example of an input screen of an information-link system for inputting a link code according to an embodiment of the present invention. As shown in FIG. 9, the link code is expressed by a fixed format that consists of the initial "P:" and a combination of 3 three-digit numbers, with a hyphen between the first and second sets of three-digit numbers and between the second and third sets of three-digit numbers. Provided at the upper part of the input screen are number fields 901, which are used to display such a three-digit number, which is variable. Below the number fields 901 is shown a numeric keypad 902 for inputting numbers. If 9 numbers (consisting of three sets of 3 numbers each) are input into the applicable fields using the numeric keypad, the 9 inputted numbers are displayed in the number fields 901. After the number inputting is completed, and if a "GO"

button on the right side of the number fields 901 is selected, the inputted link code is sent to the information-link device.

Figure 10:
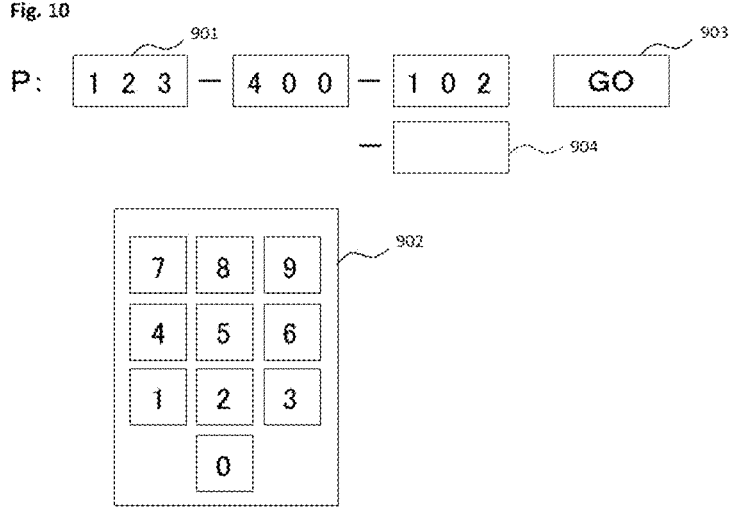
FIG. 10 is an illustration of an example of an input screen of an information-link system for inputting a link code according to an embodiment of the present invention.

FIG. 10 shows an input screen for inputting hierarchically organized link codes through a user terminal as an example of an input screen of an information-link system for inputting a link code according to an embodiment of the present invention. As shown in FIG. 10, the input screen further includes a branch-number input field 904, which is added to the input screen for the link code shown in FIG. 9. Now as already shown in FIG. 8, the link code P:123-400-102 is positioned at the highest level of the link-code hierarchy, and if "123," "400," and "102" are input into the respective number fields 901 in FIG. 10, and if the "GO" button 903 is selected, the link code P:123-400-102 is sent to the information-link device. Because the information-link device can determine that the link code P:123-400-102 is positioned at the highest level of the link-code hierarchy according to the link-code management table shown in FIG. 8, the information-link device sends instructions to the user terminal to display the branch-number input field 904 on the input screen of the user terminal.

Thus, the user can specify a link code by inputting a branch number 1 or 2. Selecting the "GO" button 903 allows the user to obtain the information associated with the link code P:123-400-103, which is specified by the branch number 1, or the information associated with the link code P:123-400-104, which is specified by the branch number 2. The obtained information is to be opened in the screen that differs from the link-code input screen, whereby the user can obtain the information associated with the link code just by inputting branch numbers.

Figure 11:
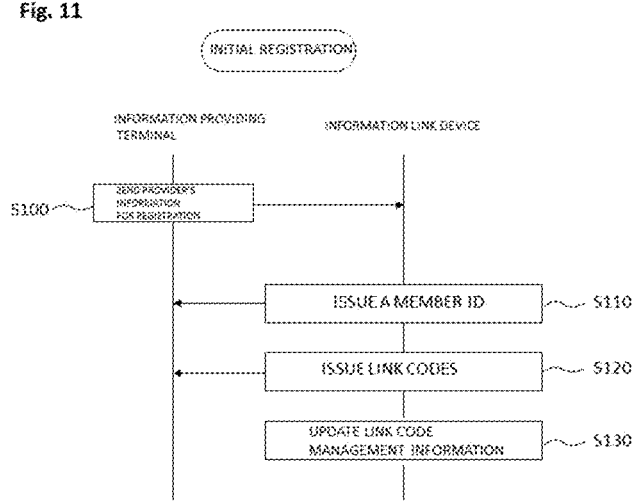
FIG. 11 is a flow chart that shows how the initial registration is processed in the operation of an information-link system according to an embodiment of the present invention.

FIG. 11 is a flow chart that shows how an information provider's initial registration is processed in the operation of the information-link system according to an embodiment of the present invention. As shown in FIG. 11, the processing of the initial registration by the information-link system includes the following steps: a step in which an information-providing terminal sends to the information-link device the information provider's information necessary for registration (Step S100); a step in which the information-link device issues a member ID (Step S110); a step in which the information-link device issues link codes (Step S120); and a step in which the information-link device updates the link-code management information and saves the updated information (Step S130).

In Step (S100), in which the information provider's information needed for registration is sent in order for the information concerning the information provider to be registered at the information-link device, basic information to identify the information provider, such as the person's name and e-mail address, is sent from the information-providing terminal to the information-link device. In addition to the basic information concerning the information provider, a password that is designated by the information provider may be included in the information for registration. Sending the information for registration includes a request for issuing a member ID and a request for issuing link codes that are issued when an initial registration is made. Sending those two requests may be made in such a way that buttons dedicated to such requests are displayed on the information-providing terminal, so that the information provider selects the respective buttons for sending the signal containing the request for issuing a member ID or the signal containing the request for issuing the link codes.

If the ID-management part of the information-link device receives the registration information, the ID-management part issues a member ID to the information provider (S110).

The member ID is a code uniquely assigned to each information provider and used for identifying the information provider so that the same member ID is not assigned to different information providers. At this time, the ID-management part associates the issued member ID with the basic information that the information provider has submitted in order to register, and stores such associated information in the storage part as ID-management information. Also, a file-transfer program based on a file transfer protocol (FTP) may be sent to the information-providing terminal when the member ID is issued so as to meet the information provider's needs to upload a data file that is used when a file link is created, which uploading will be explained later.

In Step S120, the link-code-management part of the information-link device issues the link codes that are to be issued during the initial registration process. Each of the link codes is expressed in a fixed format, which consists of the initial "P:" and a combination of 3 three-digit numbers, with a hyphen between the first and second sets of three-digit numbers and between the second and third sets of three-digit numbers such as "P:123-400-000," which results in 10 serial-link codes being issued. In Step S130, the link-code-management part updates the link-code management information in which the basic information concerning the information provider, the member ID, and the issued link codes are associated and managed, and stores the updated information. If a password is included in the registration information, the password also is stored in the link-code management information.

Figure 12:
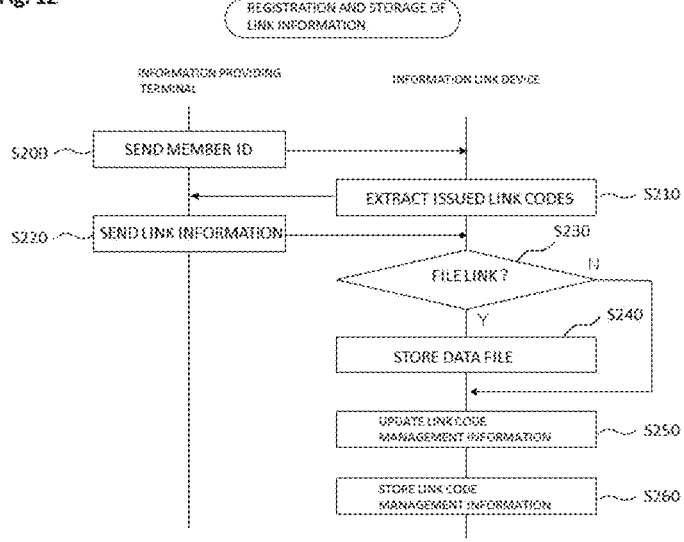
FIG. 12 is a flow chart that shows how the registration and storage of link information is processed in the operation of an information-link system according to an embodiment of the present invention.

FIG. 12 is a flow chart that shows how the registration and storage of link information is processed in the operation of the information-link system according to an embodiment of the present invention. As shown in FIG. 12, in Step S200, the information provider's member ID is sent from the information-providing terminal. If a password is created at the initial registration, as shown in FIG. 11, the password is sent along with the member ID. If the information-link device receives a member ID, it identifies the information provider based on the received member ID in Step S210, extracts the issued link codes, and sends them to the information provider. If a password has been created, the information-link device determines whether the combination of the information provider's member ID and the password that the information-link device has received correspond to the combination of the information provider's member ID and password stored at the initial registration. If the former combination is the same as the latter combination, the information-link device identifies the information provider.

In Step S220, the information provider selects from among the issued multiple link codes a link code with which link information is to be associated, and associates the link code with a URL or the location of a data file that the information provider wants to associate with the selected link code, so that the associated link code and the URL or the location of the data file are sent to the information-link device. In Step S230, the information-link device determines whether the sent link information is a URL or a file link. If the sent link information is a file link, in Step S240 the uploaded data file is stored in the storage part. Then, in Step S250, the link code and the URL or the storage location of the data file associated with the link code is entered into the link-code management table to store them, and in Step S260, the updated link-code management table is stored in the storage part.

In the link-information registration and storage process shown in FIG. 7, there may be included—prior to Step S220 in which the associated link code and the URL or the location of the data file are sent to the information-link device—a step in which the information provider instructs that the hierarchical organization of the link code is made. The flow chart of FIG. 12 shows the link-information registration and storage process when new link information is registered. However, when link information with which a link code had already been associated is replaced by new link information, this flow chart is applicable. In this case, the already stored information is replaced by the newly sent information, which is stored as updated information.

Figure 13:
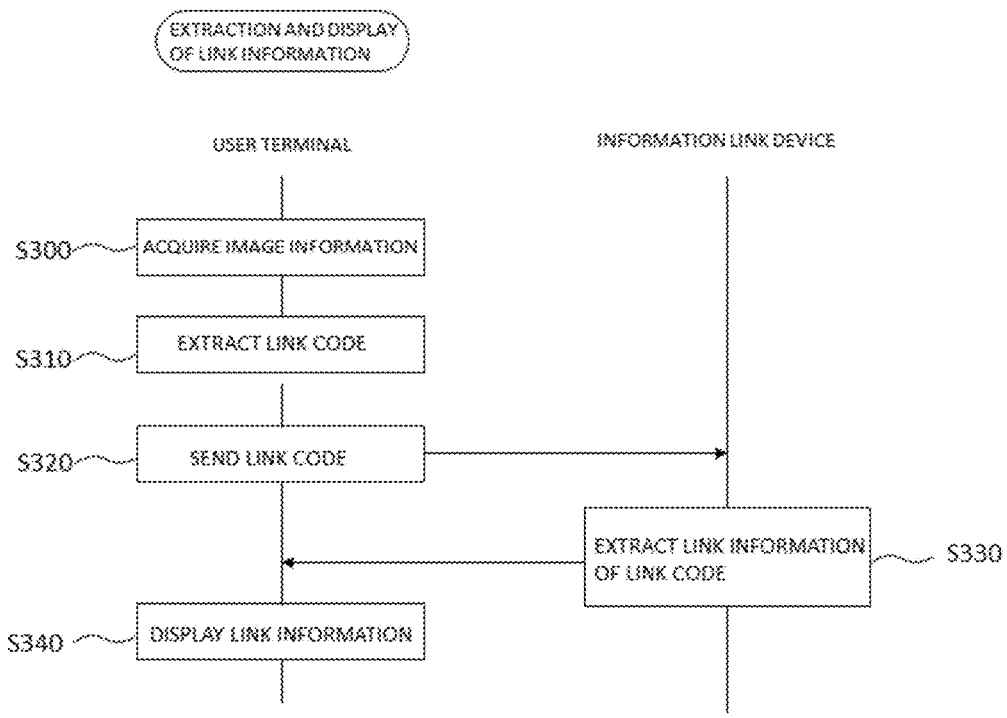
FIG. 13 is a flow chart that shows how the extraction and display of link information is processed in the operation of an information-link system according to an embodiment of the present invention.

Although link codes are issued when the initial registration is made, as was explained earlier and as shown in FIG. 11, additional link codes may be issued in response to a request from the information provider before the link information is registered. FIG. 13 is a flow chart that shows how the extraction and display of link information is processed in the operation of the information-link system according to an embodiment of the present invention. The flow chart in FIG. 13 shows the processing process made by the user terminal 301 of the Information-Link System 2 shown in FIG. 2.

In Step S300, the user terminal acquires, by the image-acquisition part, the image corresponding to the link code that is on a tangible object as image data. In Step S310, the character-recognition means of the extraction part recognizes the link code in the image, and extracts the link code from the image. In Step S320, the extracted link code is sent to the information-link device. In Step S330, based on the link code sent by Step S320, the information-link device extracts the URL or the location of the data file associated with the link code, and sends the URL or the location of the data file to the user terminal. In Step S340, the webpage linked to the URL or the data file is displayed on the user terminal.

FIG. 13 shows the processing by the user terminal 301 of the Information-Link System 2 shown in FIG. 2. The processing by the user terminal 302 of the Information-Link System 3 includes—instead of Step S310 in FIG. 13, in which the link code is recognized and extracted—a step in which the discrimination part determines whether an acquired image is equivalent to a specific image stored in the registration part, and if the acquired image is determined to be equivalent to a specific stored image, the numbers associated with the specific stored image are extracted, forming a link code. The processing by the user terminal 303 of the Information-Link System 4 in FIG. 4 is also explained, as shown in FIG. 13, as follows. The processing by the user terminal 303 includes—instead of the image-acquisition Step S300 and the link-code-extraction Step S310 in FIG. 13—a step in which the voice-recognition part recognizes voices, and converts a voice that is reading out the numbers of a link code into numerical data that forms a link code.

The processing by the user terminal 304 of the Information-Link System 5 in FIG. 5 is also explained, as shown in FIG. 13, as follows. The processing by the user terminal 304 includes—instead of the image-acquisition Step S300 and the link-code extraction Step S310 in FIG. 13—a step in which the discrimination unit determines whether a recognized sound is equivalent to a specific sound stored in the registration unit, and if the recognized sound is determined to be equivalent to a specific sound, the numbers associated with the specific sound are extracted so as to form a link code. The processing by the user terminal 305 of the Information-Link System 6 in FIG. 6 is also explained, as shown in FIG. 13, as follows. The processing by the user terminal 305 includes a step in which the discrimination unit determines whether a recognized action by a specific user is equivalent to a specific user's action stored in the registration unit. If the recognized user's action is determined to be equivalent to a specific user's stored action, then instead of the image-acquisition Step S300 and the link-code extraction Step S310 in FIG. 13, the numbers associated with the specific user's stored action are extracted so as to form a link code.

Figure 14:
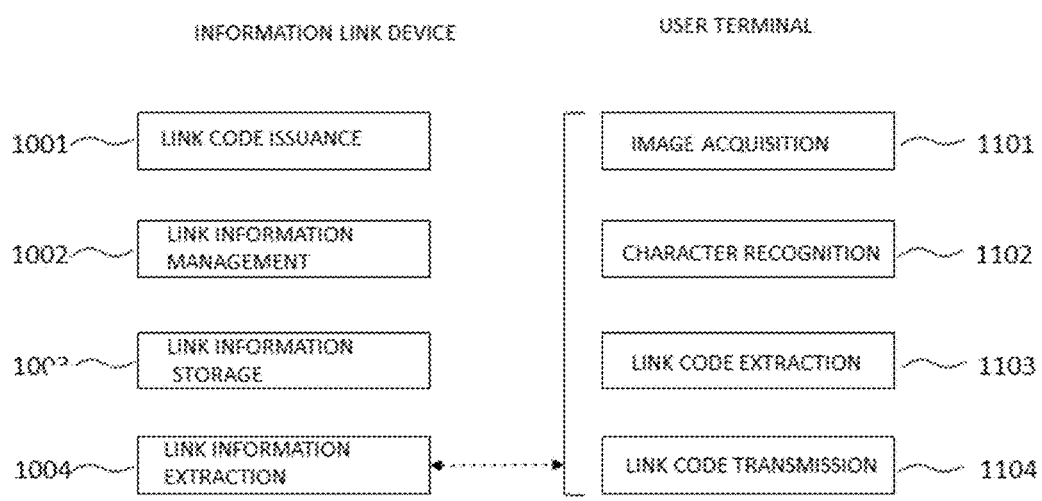
FIG. 14 is a schematic diagram that shows the program structure of an information-link system according to an embodiment of the present invention.

FIG. 14 is a schematic diagram that shows the program structure of the information-link system according to an embodiment of the present invention. FIG. 14 shows the organization of each program used by the information-link device and the user terminal. The program used by the information-link device includes the following components: the link-code-issuance component 1001, the link-information-management component 1002, the link-information-storage component 1003, and the link-information-extraction component 1004.

The link-code issuance component 1001 issues link codes in response to a request from an information provider, with each link code configured so as to have a fixed format. The link-information-management component 1002 controls the link-code-management part so that the link-code-management part—based on the link information sent from the information-providing terminal, with said link information including URLs or the locations of data files—associates link codes with the URLs or with the locations of data files so as to manage the relationship between the link codes and the URLs or the locations of the data files. The link-information-storage component 1003 stores in the storage part the data file and the management information managed by the link-code-management part. The link-information-extraction component 1004 controls the link-information-extraction part so that the link-information-extraction part extracts the URLs or the locations of the data files associated with the received link codes sent from the user terminal, and displays on the user terminal the webpages linked to the URLs or to the data files.

The components of the program used by the user terminal are the image-acquisition component 1101, the character-recognition component 1102, the link-code-extraction component 1103, and the link-code-transmission component 1104. The mage-acquisition component 1101 acquires as image data the image on a tangible object. The character-recognition component 1102 controls the extraction part so that the extraction part recognizes the characters in the image data that has been acquired. The link-code-extraction component 1103 extracts a character string as a link code if the recognized characters include a character string that is configured in a fixed format. The link-code-transmission component 1104 controls the user terminal so as to send the extracted link code to the information-link device.

The advantageous effects brought by using the information-link system of the present invention will now be explained. The link code has a fixed format that is defined by 9 numbers (consisting of three sets of 3 numbers each). Therefore, a user of the Internet can directly and surely access the information associated with a link code by inputting the 9 numbers of the link code that, for example, is on a printed material or is read out in an announcement. Accordingly, the link code is suitable in emergency situations such as finding an evacuation route, or determining how to access a bulletin board for sharing safety information. Thus, by use of a note or via a telephone conversation, access destinations on the Internet can be conveyed using link codes.

If link codes are shown in places where access to the Internet is not easily available, such as at the front of a shop, on a train, in a place where photography is prohibited, or on a street, a user can take a note of the 9 numbers of the link code, and can later access the information associated with the link code. Easy access by users to information concerning products sold, locations of real estate sold, or venues for exhibitions, is made by including link codes on products, labels, leaflets, or signboards. Users can access such information directly using link codes without visiting the home page of the related websites. In addition, while making a sales pitch, presenting public relations information, presenting a class or a seminar, helping a customer, or guiding a visitor, link codes can be used for easily downloading required oral or written materials, or directly accessing relevant webpages.

Unlike a URL, a link code is short, and therefore many link codes can be included in the limited space of a newspaper advertisement, so as to provide a large amount of information, including references to dynamic content. Because a link code is much shorter than a URL, it is applicable to a small-size medium such as a business card or a product label. As applications of link codes, new types of publications or leaflets, such as composite publications or composite leaflets, can be realized by associating any part of a publication or a leaflet with related information accessible via the Internet. For example, indexes or category names printed on a paper can be associated with link codes, so that different information that is related to each other but is scattered on the Web can be put together and compiled to create a composite-data book. Thus, by combining electronic information with a paper-print publication, the amount of paper consumed can be reduced, which lowers the burden on the environment.

A link code can be associated with the storage location of a video, which makes it possible to timely replace one video by another video. Accordingly, the use of a link code makes it easy to open a regional broadcasting station, and to distribute programs. Also, a link code is easily adaptable to foreign languages, and by including link codes in information boards, guidebooks, leaflets, or documents, can facilitate foreigners' access to corresponding information entered in foreign languages on the Web. Web-search systems generally uses keywords, so that the system displays many webpages in response to an inputted keyword. Therefore, it takes time and effort for a user of such a search system to access the webpage(s) containing the information that is described. However, a link code allows a user to directly access the desired information, whereby the time consumed for searching information is reduced, which reduces power consumption and lowers the burden on the environment.

Although the invention has been shown and described with respect to particular embodiments thereof and with reference to drawings, this is for the purpose of illustration rather than limitation, and other variations and modifications of the specific embodiments described/shown herein and within the intended sprit and scope of the invention, will be apparent to those skilled in the art.

LIST OF REFERENCE SIGNS 1, 2, 3, 4, 5, 6 information-link system
50 network
100 information-link device
110, 210, 310 control part
120, 220, 320 input/output part
130 storage part
140 link-code-management part
150 link-information-extraction part
160 ID-management part
200 information-providing terminal
220, 320 input/output part
230, 330 display part
300, 301, 302, 303, 304, 305 user terminal
340 image-acquisition part
342, 367, 372 registration part
343, 368, 373 discrimination part
350 extraction part
360 voice-recognition part
365 sound-recognition part
366, 371 recognition unit
370 action-recognition part

The invention claimed is:

1. An information-link system comprising:
an information-link device, an information-providing terminal, and a user terminal, each of which is connected with each other via a network;
the information-link device including a link-code-management part, a storage part, and a link-information-extraction part;
wherein the link-code-management part:
issues link codes in response to a request from an information provider, with each of the link codes having a predetermined fixed format,
associates each of the link codes with a URL corresponding to the issued link codes or a storage location of a data file, and
manages the associated link code and the URL or the storage location of the data file, based on link information that includes the URL and the storage location of the data file, the link information being sent from the information-providing terminal,
wherein the storage part stores the data file and management information that is managed by the link-code-management part; and
wherein the link-information-extraction part:
extracts the URL or the location of the data file that has been associated with the link code, based on the link code sent from the user terminal; and
allows the user terminal to display the webpage of the URL or the data file;
wherein the URL or the location of the data file, which has been associated with the link code, is changed in response to the request from the information provider;
wherein the issued multiple link codes are issued to the information provider, and are provided to the information-providing terminal so that the multiple issued link codes are displayed on information-providing-terminal screens along with the corresponding hierarchy-creation buttons, and are hierarchically organized in response to the request from the information provider;
wherein the hierarchically organized link codes are associated with the URLs or the locations of the data files, using the link codes that are higher in the link-code hierarchy and the branch numbers; and
wherein, if the link code that is sent from the user terminal is higher in the link-code hierarchy, the information-link device allows the user terminal to display an input field of the branch number.

2. The information-link system according to claim 1, wherein the user terminal includes
an image-acquisition part that acquires an image that is on a tangible object and that includes the link code, and
an extraction part that recognizes the link code in the image and extracts the link code from the image, and
wherein the link code that is to be sent from the user terminal has been displayed on the tangible object.

3. The information-link system according to claim 1, wherein the user terminal includes an image-acquisition part that acquires an image, a registration part that associates a specific image with an optional number and stores the associated image and number, and a discrimination part that compares the acquired image with the specific image stored in the registration part, and that extracts a number associated with the specific image when the acquired image is determined to be equivalent to the specific image, and wherein the link code that is to be sent from the user terminal is configured in advance to include the numbers that are to be extracted by the discrimination part.

4. The information-link system according to claim 1, wherein the user terminal includes a voice-recognition part that recognizes voices, and that converts the numbers of the link code voiced by a user into number data that form a link code that the user terminal sends to the information-link system, and wherein the link code that is to be sent from the user terminal is configured in advance to include the number data.

5. The information-link system according to claim 1, wherein the user terminal includes a sound-recognition part that recognizes sounds and that includes a recognition unit that recognizes sounds, a registration unit that associates a specific sound with an optional number and stores the associated sound and number, and a discrimination unit that compares a recognized sound with specific sounds stored in the registration unit, and that extracts a number associated with a specific sound when the recognized sound is determined to be equivalent to the specific sound, and wherein the link code that is to be sent from the user terminal is configured in advance to include the numbers that are to be extracted by the discrimination unit.

6. The information-link system according to claim 1, wherein the user terminal includes an action-recognition part that includes a recognition unit that recognizes a user's action, a registration unit that associates a specific user's particular action with an optional number and stores the associated action and number, and a discrimination unit that compares a recognized action with the specific actions stored in the registration unit, and that extracts the number associated with a specific action when the recognized action is determined to be equivalent to the specific action, and wherein the link code that is to be sent from the user terminal is configured in advance to include the numbers that are to be extracted by the discrimination unit.

7. A non-transitory computer-readable record medium that stores a program used in an information-link device of an information-link system that includes an information-link device, an information-providing terminal, and a user terminal, each of which is connected with each other via a network;

wherein the program controls a link-code-management part so that the link-code-management part:

issues link codes in response to requests from an information provider, with each of the link codes having a predetermined fixed format, associates each of the link codes with the URL corresponding to each of the issued link codes or a location of a data file, based on link information that includes a URL and the storage location of a data file, which is sent from the information-providing terminal, and manages the associated link codes and the link information;

wherein the program stores, in a storage part, the data file and management information that is managed by the link-code-management part;

wherein the program controls a link-information-extraction part so that the link-information-extraction part:

extracts the URL or the location of the data file that has been associated with the link code, based on the link code sent from the user terminal, and allows the user terminal to display the webpage of the URL or the data file;

wherein the issued multiple link codes are provided to the information-providing terminal so that the multiple issued link codes are displayed on information-providing-terminal screens along with the corresponding hierarchy-creation buttons, and are hierarchically organized in advance in response to the request from the information provider, and the hierarchically organized link codes are associated with the URLs or the locations of data files, using the link codes that are higher in the link-code hierarchy and the branch numbers; and wherein the program controls the information-link device in such a way that, if a link code that is sent from the user terminal is higher in the link-code hierarchy, the information-link device allows the user terminal to display, on a display part of the user terminal, an input field of the branch number.

8. A non-transitory computer-readable record medium that scores a program used in a user terminal of an information-link system that includes an information-link device, an information-providing terminal, and a user terminal, each of which is connected with each other via a network, wherein the program controls:

an image-acquisition part so that the image-acquisition part acquires an image that is on a tangible object;

the user terminal so that the extraction part recognizes the characters included in the image data that has been acquired, extracts a character string as a link code if the recognized characters include a character string that is configured in a predetermined fixed format, and sends the extracted link code to the information-link device;

wherein the issued multiple link codes are provided to the information-providing-terminal so that the multiple issued link codes are displayed on information-providing-terminal screens along with the corresponding hierarchy-creation buttons and are hierarchically organized in advance in response to the request from the information provider, and are associated with URLs or locations of data files, using the link codes that are higher in the link-code hierarchy and the branch numbers; and wherein the program controls the user terminal in such a way that, if the link code is higher in the link-code hierarchy, the user terminal displays on a display part of the user terminal an input field of the branch number.

9. A method for operating an information-link system that includes an information-link device, an information-providing terminal, and a user terminal, each of which is connected with each other via a network, the method comprising:

a step in which the information-link device issues link codes, each of which has a predetermined fixed format;

a step in which the information-link device receives, from the information-providing terminal, link information that includes URLs and the storage locations of data files that correspond to the link codes, and registers the link information;

a step in which, based on the registered link information, the information-link device associates the link codes with the URLs or the locations of the data files, and stores the associated link codes and the URLs or the locations of the data files; and a step in which the information-link device receives the link codes from the user terminal, extracts the URLs or the locations of the data files associated with the link codes, and displays on the user terminal the webpages of the URLs or the data files;

wherein the issued multiple link codes are simultaneously issued by the information-link device, and are provided to the information-providing terminal so that the multiple issued link codes are displayed on the information-providing-terminal screens along with the corresponding hierarchy-creation buttons; and wherein the step for registering the link information is done to the link codes corresponding to the received link information, among the multiple link codes, among the multiple link codes; and wherein there exists a further a step in which the information-link device receives from the information-providing terminal the link codes, link codes that are higher in the link-code hierarchy, and branch numbers, and configures the multiple link codes in a hierarchical structure;

wherein the hierarchically organized link codes are associated with the URLs or the locations of the data files, using the link codes that are higher in the link-code hierarchy and the branch numbers; and wherein, if the link code that is sent from the user terminal is higher in the link-code hierarchy, the information-link device allows the user terminal to display an input field of the branch number.

10. The method of operating an information-link system according to claim 9, said method further including:

a step in which, if the information-link device receives link information that includes a Previously Presented URL or a Previously Presented location of a data file, and that corresponds to the stored link code that has been associated with the URL or the location of the data file, the Previously Presented link information is registered in the information-link device as updated link information; and a step in which, based on the updated link information, the information-link device updates and stores the associated link code and the URL or the location of the data file.

11. The method of operating an information-link system according to claim 9, wherein the link code sent from a user terminal is extracted by the user terminal from the image data on a tangible object, the image data having been acquired by the user terminal.

12. The method of operating an information-link system according to claim 9, wherein, when a discrimination part determines that an image acquired by the user terminal is equivalent to a specific image stored in the system's registration part, the link code that is to be sent from the user terminal includes optional numbers that have been associated with the specific image.

13. The method of operating an information-link system according to claim 9, wherein a link code that is to be sent from the user terminal includes number data that has been converted from a voice recognized by the user terminal.

14. The method of operating an information-link system according to claim 9, wherein, when a sound recognized by the user terminal is determined to be equivalent to a specific sound that has been registered at a registration unit of the system, the link code that is to be sent from the user terminal includes optional numbers that have been associated with the specific sound.

15. The method of operating an information-link system according to claim 9, wherein, when a specific user's action recognized by the user terminal is determined to be equivalent to a specific action that has been stored in a registration unit of the system, the link code that is to be sent from the user terminal includes optional numbers that have been associated with the specific action.

* * * * *